United States Patent
Pavlov

(10) Patent No.: US 11,333,294 B2
(45) Date of Patent: May 17, 2022

(54) GAMING CHAIR ASSEMBLY WITH MODULAR MULTI-MONITOR MOUNT SYSTEM

(71) Applicant: Home Racer LLC, Boynton Beach, FL (US)

(72) Inventor: Dimitar Pavlov, Boynton Beach, FL (US)

(73) Assignee: HOME RACER LLC, Boynton Beach, FL (US)

(*) Notice: Subject to any disclaimer, the term of this patent is extended or adjusted under 35 U.S.C. 154(b) by 0 days.

(21) Appl. No.: 17/413,236

(22) PCT Filed: Mar. 3, 2021

(86) PCT No.: PCT/US2021/020759
§ 371 (c)(1),
(2) Date: Jun. 11, 2021

(87) PCT Pub. No.: WO2021/178600
PCT Pub. Date: Sep. 10, 2021

(65) Prior Publication Data
US 2022/0120374 A1 Apr. 21, 2022

Related U.S. Application Data

(60) Provisional application No. 62/984,787, filed on Mar. 3, 2020.

(51) Int. Cl.
*A47C 7/72* (2006.01)
*F16M 11/08* (2006.01)
(Continued)

(52) U.S. Cl.
CPC ............. *F16M 11/08* (2013.01); *A47C 7/723* (2018.08); *F16M 11/045* (2013.01);
(Continued)

(58) Field of Classification Search
CPC ........ A47C 7/723; F16M 11/08; F16M 11/26; A47B 45/00; A47B 46/00;
(Continued)

(56) References Cited

U.S. PATENT DOCUMENTS

2004/0172887 A1* 9/2004 Moglin ................... A47C 7/72
52/36.1
2007/0035164 A1 2/2007 North
(Continued)

FOREIGN PATENT DOCUMENTS

CN 110220091 A * 9/2019 ............ F16M 11/26
CN 111963861 A * 11/2020
(Continued)

*Primary Examiner* — Timothy J Brindley
(74) *Attorney, Agent, or Firm* — Mark C. Johnson; Johnson Dalal

(57) ABSTRACT

A gaming chair assembly with modular multi-monitor mount system that includes a monitor framing assembly couplable to a modular gaming chair frame assembly, wherein the monitor framing assembly includes a plurality of tubular framing elements selectively coupled together and include a lower leg support frame coupled to the modular gaming chair frame assembly and a central, left, and right monitor frame elements with two substantially parallel sections flanking and defining a central channel. The central monitor frame element may include a left and a right central hinge member selectively, translatably, lockably, and telescopically coupled to the central monitor frame element. The monitor frame elements include screen support bracket frame elements selectively, translatably, and lockably coupled to the two substantially parallel sections and include electronic display brackets thereto to enable adjustment and support for multiple electronic displays relative to the modular gaming chair frame assembly.

16 Claims, 14 Drawing Sheets

(51) Int. Cl.
*F16M 11/26* (2006.01)
*A47B 97/00* (2006.01)
*F16M 11/20* (2006.01)
*F16M 11/04* (2006.01)

(52) U.S. Cl.
CPC ......... *F16M 11/2092* (2013.01); *F16M 11/26* (2013.01); *A47B 2097/005* (2013.01); *F16M 2200/022* (2013.01); *F16M 2200/027* (2013.01); *F16M 2200/028* (2013.01)

(58) Field of Classification Search
CPC ............ A47B 2083/025; A47B 96/061; A47B 97/001; A47B 2097/005
See application file for complete search history.

(56) References Cited

U.S. PATENT DOCUMENTS

| | | | | |
|---|---|---|---|---|
| 2009/0206641 | A1* | 8/2009 | Brown, Jr. | A47C 7/727 297/217.3 |
| 2009/0218860 | A1 | 9/2009 | Hernandez et al. | |
| 2011/0254327 | A1 | 10/2011 | Halsey | |
| 2012/0223555 | A1* | 9/2012 | Brown, Jr. | A47C 7/727 297/217.4 |
| 2014/0084642 | A1 | 3/2014 | Park | |
| 2014/0265460 | A1* | 9/2014 | Voigt | A47C 1/037 297/61 |
| 2015/0250310 | A9 | 9/2015 | Martin et al. | |
| 2018/0199724 | A1* | 7/2018 | Bray | F16M 13/022 |
| 2020/0015588 | A1* | 1/2020 | Patrick | F16M 11/105 |

FOREIGN PATENT DOCUMENTS

| | | | | |
|---|---|---|---|---|
| CN | 112879768 A | * | 6/2021 | |
| CN | 113205727 A | * | 8/2021 | |
| DE | 102018133704 B3 | * | 2/2020 | ......... G09F 15/0056 |
| KR | 102208820 B1 | * | 1/2021 | |
| WO | WO-2013067649 A1 | * | 5/2013 | ............. A47C 7/624 |
| WO | WO-2014197907 A1 | * | 12/2014 | ........... A47B 81/064 |

* cited by examiner

GAMING CHAIR ASSEMBLY WITH MODULAR MULTI-MONITOR MOUNT SYSTEM

FIELD OF THE INVENTION

The present invention relates generally to gaming chairs with a monitor mounting frame and, more particularly, relates to a modular gaming chair frame with a multi-monitor mounting frame.

BACKGROUND OF THE INVENTION

Many users utilize gaming chairs for personal or business use, and other entertainment purposes. The electronic display (or monitor) for viewing the video game(s) associated with the said gaming chairs is an important feature for many users. Specifically, many users believe that the more viewing area for an electronic display, the more advantageous the gameplay. Due to the amount of vibration and movement these gaming chairs sustain, many of these chairs are unable to accommodate a larger sized electronic display or multiple electronic displays.

Some known gaming chairs do not enable multiple electronic displays to be utilized on the gaming chairs. Those gaming chairs that do, fail to provide efficient and effective adjustment and stabilization of the electronic displays.

Therefore, a need exists to overcome the problems with the prior art as discussed above.

SUMMARY OF THE INVENTION

The invention provides a gaming chair assembly with modular multi-monitor mount system that overcomes the hereinafore-mentioned disadvantages of the heretofore-known devices and methods of this general type.

With the foregoing and other objects in view, there is provided, in accordance with the invention, a gaming chair assembly with modular multi-monitor mount system that includes a modular gaming chair frame assembly with a plurality of tubular frame elements selectively coupled together and with a base frame assembly defining a support plane and a center post assembly coupled to the base frame assembly and including a center post frame element disposed in an upright orientation respect to the support plane. The system or assembly also includes a monitor framing assembly having a plurality of tubular framing elements selectively coupled together and with a first lower leg frame element and a second lower leg frame element directly coupled to the base frame assembly and a first monitor frame vertical extension element selectively, translatably, lockably, and telescopically coupled to the first lower leg frame element and a second monitor frame vertical extension element selectively, translatably, lockably, and telescopically coupled to the second lower leg frame element. Additionally, the system includes a central monitor frame element having two substantially parallel sections flanking and defining a central channel and having a left side and right side opposing the left side of the central monitor frame element, a left central hinge member selectively, translatably, lockably, and telescopically coupled to the left side of the central monitor frame element, and a right central hinge member selectively, translatably, lockably, and telescopically coupled to the right side of the central monitor frame element. The system also includes a left monitor frame element having two substantially parallel sections flanking and defining a central channel and having a left free side and a right side opposing the left free side of the left monitor frame element and rotatably coupled to the left central hinge member about a hinge. Further, the system includes a right monitor frame element having two substantially parallel sections flanking and defining a central channel and having a left side rotatably coupled to the right central hinge member about a hinge and having a right free side opposing the left side of the right monitor frame element. Moreover, the system includes a first screen support bracket frame element with opposing ends selectively, translatably, and lockably coupled to the two substantially parallel sections of the central monitor frame element and disposed within the central channel defined thereon, wherein the first screen support bracket frame element having an electronic display bracket coupled thereto, the electronic display bracket operably configured to retain an electronic display thereon. A second screen support bracket frame element with opposing ends may also be utilized that is selectively, translatably, and lockably coupled to the two substantially parallel sections of the left monitor frame element and disposed within the central channel defined thereon, wherein the second screen support bracket frame element having an electronic display bracket coupled thereto, the electronic display bracket operably configured to retain an electronic display thereon. Further, a third screen support bracket frame element with opposing ends may be utilized that is selectively, translatably, and lockably coupled to the two substantially parallel sections of the right monitor frame element and disposed within the central channel defined thereon, the third screen support bracket frame element having an electronic display bracket coupled thereto, the electronic display bracket operably configured to retain an electronic display thereon.

Also in accordance with the present invention, a gaming chair assembly with modular multi-monitor mount system is disclosed that includes a modular gaming chair frame assembly having a plurality of tubular frame elements selectively coupled together and with a base frame assembly defining a support plane and a center post assembly coupled to the base frame assembly and including a center post frame element disposed in an upright orientation respect to the support plane.

The system includes a monitor framing assembly having a plurality of tubular framing elements selectively coupled together and with at least one lower leg frame element directly coupled to the base frame assembly and a central monitor frame element vertically offset from the at least one lower leg frame element and having two substantially parallel sections flanking and defining a central channel and having a left side and right side opposing the left side of the central monitor frame element, a left central hinge member selectively, translatably, lockably, and telescopically coupled to the left side of the central monitor frame element, and a right central hinge member selectively, translatably, lockably, and telescopically coupled to the right side of the central monitor frame element, wherein the center post frame element is interposed between the base frame assembly and the central monitor frame element. Further, the system includes a left monitor frame element having two substantially parallel sections flanking and defining a central channel and having a left free side and a right side opposing the left free side of the left monitor frame element and rotatably coupled to the left central hinge member about a hinge and a right monitor frame element having two substantially parallel sections flanking and defining a central channel and having a left side rotatably coupled to the right central hinge member about a hinge and having a right free side opposing the left side of the right monitor frame element. Further, the system may also include a first screen support bracket frame element with opposing ends selectively, translatably, and lockably coupled to the two substantially parallel sections of the central monitor frame element and disposed within the central channel defined thereon, the first screen support bracket frame element having an electronic display bracket coupled thereto, wherein the electronic display bracket operably configured to retain an electronic display thereon. A second screen support bracket frame element with opposing ends may also be utilized that is selectively, translatably, and lockably coupled to the two substantially parallel sections of the left monitor frame element and disposed within the central channel defined thereon, wherein the second screen support bracket frame element having an electronic display bracket coupled thereto, the electronic display bracket operably configured to retain an electronic display thereon. Further, a third screen support bracket frame element with opposing ends may be utilized that is selectively, translatably, and lockably coupled to the two substantially parallel sections of the right monitor frame element and disposed within the central channel defined thereon, the third screen support bracket frame element having an electronic display bracket coupled thereto, the electronic display bracket operably configured to retain an electronic display thereon.

Although the invention is illustrated and described herein as embodied in a gaming chair assembly with modular multi-monitor mount system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the monitor framing assembly, spanning from one side to another, wherein traverse may mean a direction spanning from the lower end to the upper end of the monitor framing assembly. As used herein, the term "wall" is intended broadly to encompass continuous structures, as well as separate structures that are coupled together so as to form a substantially continuous external surface.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
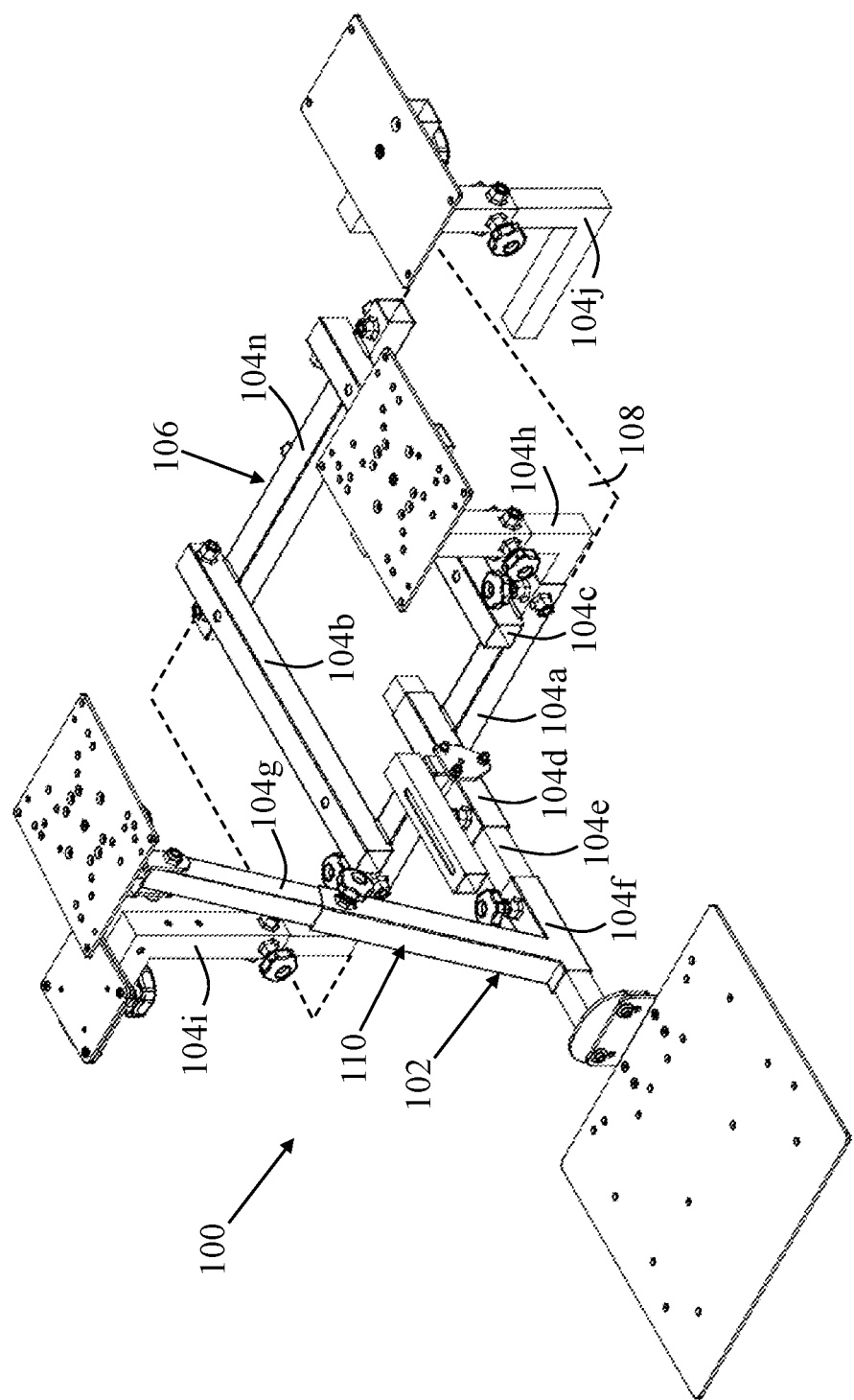
FIG. 1 is a perspective view of a modular gaming chair frame assembly utilized with a gaming chair assembly with modular multi-monitor mount system in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
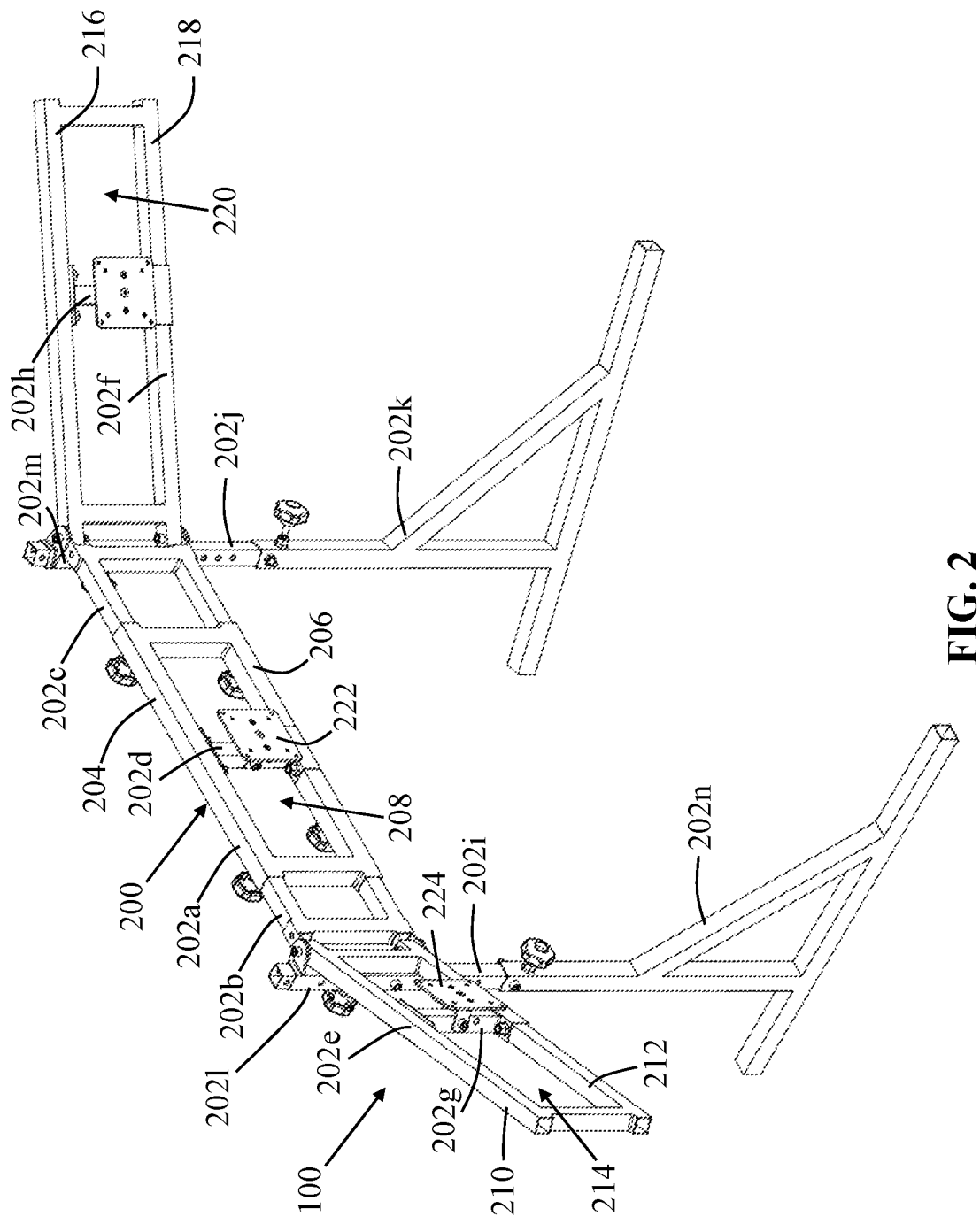
FIG. 2 is a perspective view of a monitor framing assembly utilized with a gaming chair assembly with modular multi-monitor mount system in accordance with one embodiment of the present invention.
Figure 3:
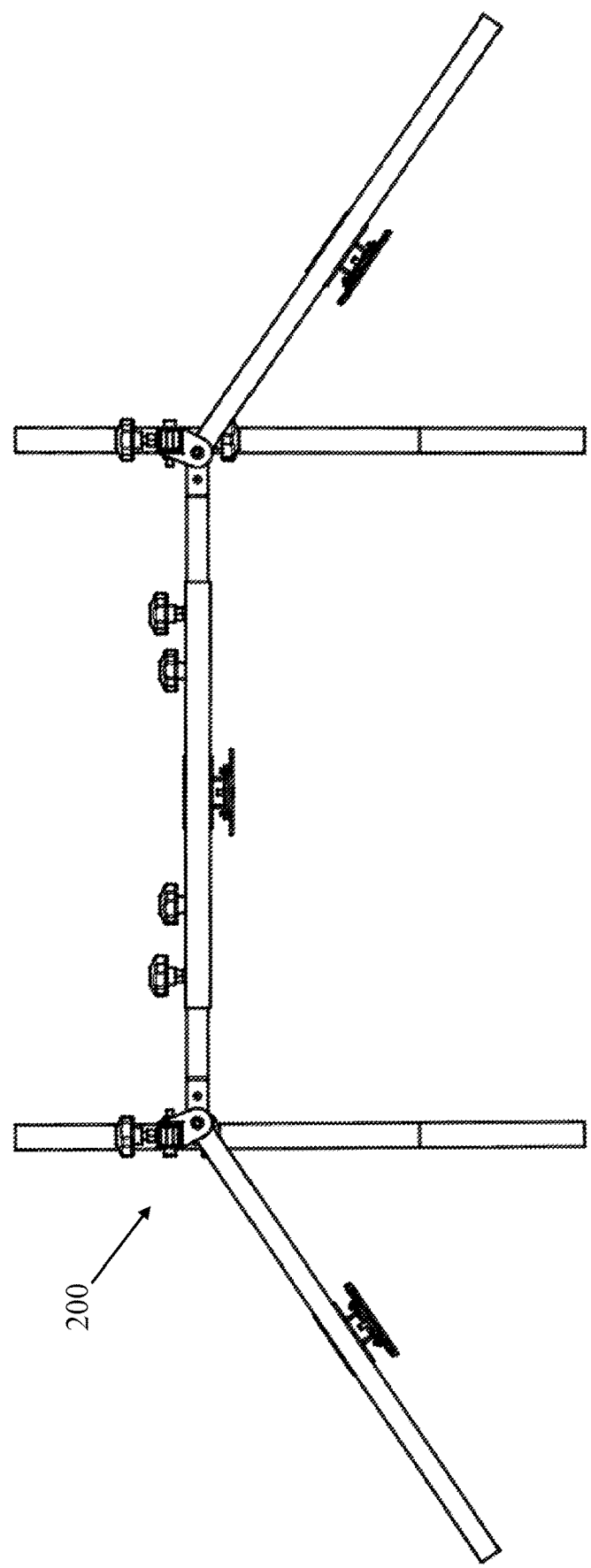
FIG. 3 is a top plan view of the monitor framing assembly in FIG. 2.
Figure 4:
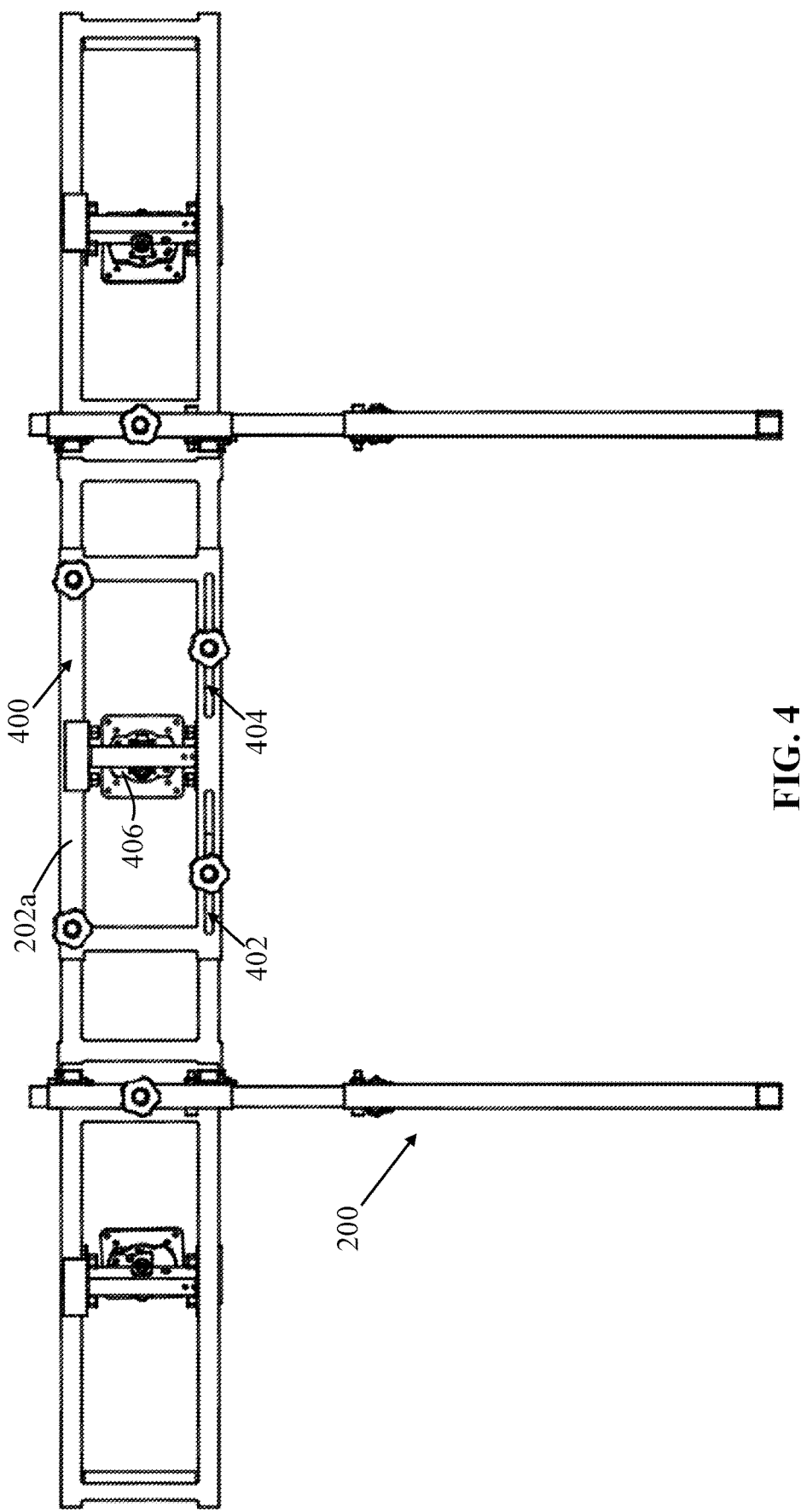
FIG. 4 is an elevational rear view of the monitor framing assembly in FIG. 2.
Figure 5:
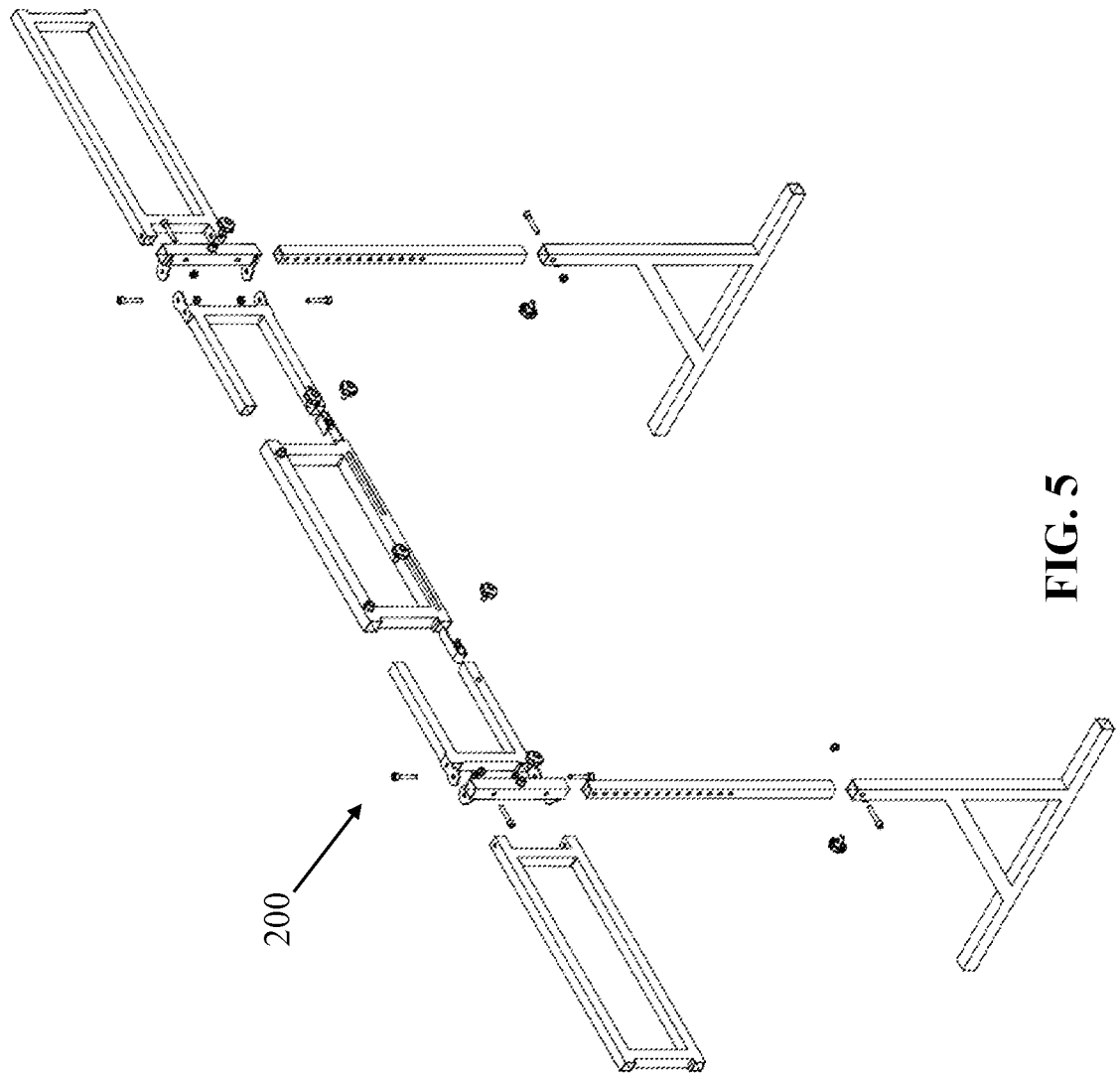
FIG. 5 is an exploded view of the monitor framing assembly in FIG. 2.

The present invention provides a novel and efficient a modular multi-monitor mount system that enables multiple electronic displays (or monitors) to be safely, efficiently, and effectively supported and adjusted. Referring now to FIGS. 1-2, one embodiment of the present invention is shown in perspective views. FIGS. 1-2 show several advantageous features of the present invention, but, as will be described below, the invention can be provided in several shapes, sizes, combinations of features and components, and varying numbers and functions of the components. The figures also depict exemplary and approximate dimensions (in millimeters) for the components utilized in the gaming chair assembly with modular multi-monitor mount system.

Figure 15:
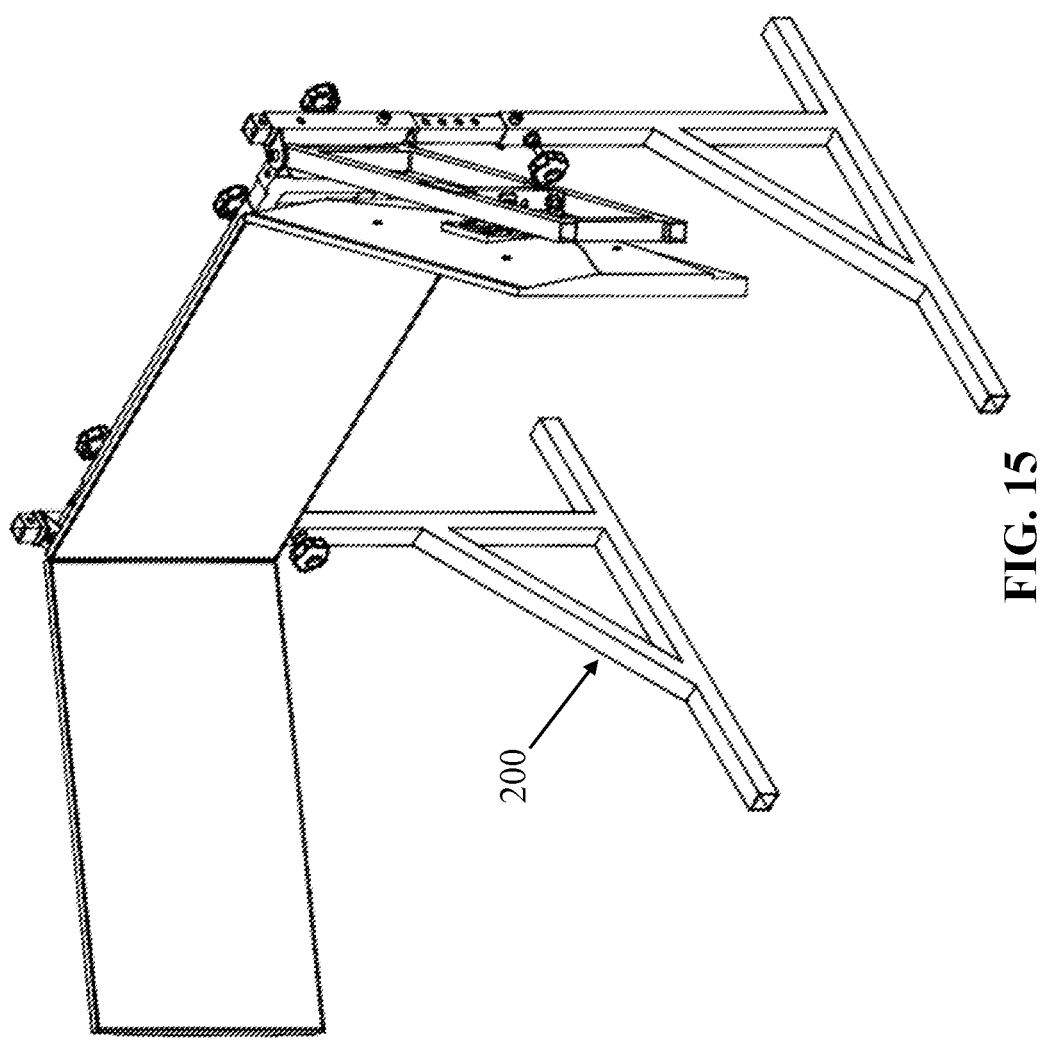
FIG. 15 is a perspective view of the monitor framing assembly in FIG. 2 with electronic displays coupled thereto.

The first example of a gaming chair assembly with modular multi-monitor mount system 100 as shown in FIGS. 1-2, includes a modular gaming chair frame assembly 102 and a monitor framing assembly 200. FIG. 2 depicts a monitor framing assembly 200 without any electronic displays coupled thereto, wherein FIG. 15 depicts the monitor framing assembly 200 with three electronic displays coupled thereto. Beneficially, the monitor framing assembly 200 is operably configured to operably coupled with the modular gaming chair frame assembly 102. In some embodiments, the monitor framing assembly 200 may be selectively and lockably (and removably) couplable to the modular gaming chair frame assembly 102.

More specifically, the modular gaming chair frame assembly 102 may have a plurality of tubular frame elements 104*a-n* that may be rectangular, cylindrical, or another oblong shape with channels defined therein, wherein "n" represents any number greater than one. The plurality of tubular frame elements 104*a-n* are beneficially selectively coupled together to form the structure depicts in FIG. 1, but said structure may look and designed differently. The plurality of tubular frame elements 104*a-n* may be of a substantially rigid and metallic material, e.g., stainless steel, aluminum, etc., but may be of another substantially rigid material. The plurality of tubular frame elements 104*a-n* include a base frame assembly 106 defining a support plane 108 (that is generally and preferably planar or flat) and a center post assembly 110 coupled to the base frame assembly 108 and including a center post frame element 104*f* disposed in an upright orientation (i.e., any angle between 0-180°) with respect to the support plane 108. Preferably, the center post frame element 104*f* disposed in an acute angle or orientation with respect to a main rudder frame element 104*e* proximal to the base frame assembly 108. The main rudder frame element 104*e* may be directly coupled to the base frame assembly 106 using a weld and may include a main rudder support plate coupled thereto (as seen in FIG. 1). The center post frame element 104*f* may be selectively, translatably, lockably, and telescopically coupled to the main rudder frame element 104*e* and centrally disposed (i.e., generally overlapping with an axis spanning through a centroid) with respect to the base frame assembly 106 for optimal balance and stability.

In one embodiment, a secondary center post frame element 104*g* may be utilized and that is selectively, translatably, lockably, and telescopically coupled to the center post frame element 104*f*. In one embodiment, the center post frame element 104*g* is interposed between the base frame assembly 106 and the central monitor frame element 202*a*. As seen in the figures, the components may be lockably coupled to one another using a fastener, such as a knurled knob or finger-gripping knob. The components may be lockably coupled together with the fastener engaging with another component via a threaded engagement or compression and/or friction.

In one embodiment, the base frame assembly 106 includes two horizontally oriented base frame elements 104*a*, 104*n* and two vertically oriented base frame elements 104*b*, 104*c* intersected with the base frame elements 104*a*, 104*n* (as seen in FIG. 1). The first and second lower leg frame elements 202*n*, 202*k* may be telescopically coupled to the two vertically oriented base frame elements 104*b*, 104*c*, respectively, wherein the internal or external diameter sizing would enable entry and egress (and sometimes compression) of corresponding frame elements (as visualized in the figures). The base frame assembly 106 may also have other beneficial attachments couplable thereto, thereby making it versatile and modular in nature.

Figure 11:
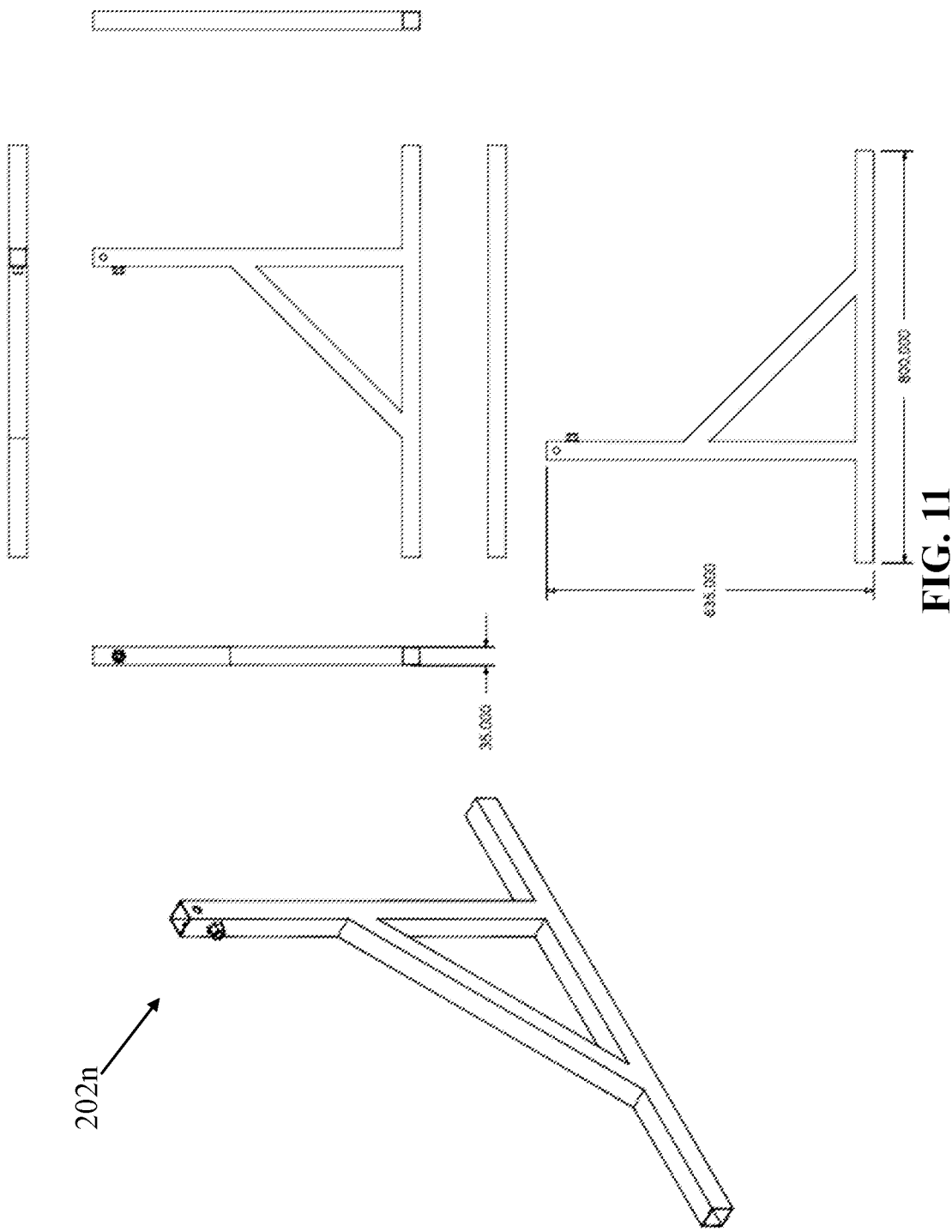
FIG. 11 are various views of a lower leg frame element of the monitor framing assembly in FIG. 2.

In one embodiment, the monitor framing assembly 200 has a plurality of tubular framing elements 202*a-n* selectively coupled together to form a structure as depicted in the figures. To enable effective stability and coupling with the modular gaming chair frame assembly 102, a first lower leg frame element 202*n* and a second lower leg frame element 202*k* may be utilized as shown in the figures. Each of the lower leg frame element 202*n*, 202*k* can be also seen exemplified in FIG. 11 and may be directly coupled to the base frame assembly 106 and may also include a lower surface that may be substantially planar.

Figure 13:
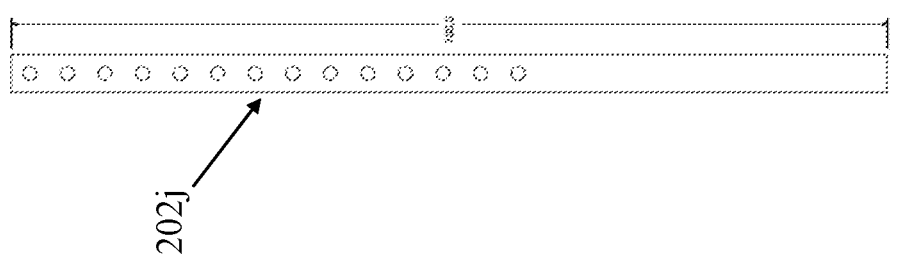
FIG. 13 is an elevational side view of a vertical frame adjustment element of the monitor framing assembly in FIG. 2.

Beneficially, a first monitor frame vertical extension element 202*i* can be seen selectively, translatably, lockably, and telescopically coupled to the first lower leg frame element 202*n*. Additionally, a second monitor frame vertical extension element 202*j* may be selectively, translatably, lockably, and telescopically coupled to the second lower leg frame element 202*k*. As seen exemplified in FIG. 13, a monitor frame vertical extension element 202*j* and beneficially enables height expansion of the monitor frame elements 202*a*, 202*e*, 202*f*. In preferred embodiments, the lower leg frame elements 202*n*, 202*k* may define a gap or space therein between to accommodate advantageous placement of the components of the modular gaming chair frame assembly 102.

Figure 8:
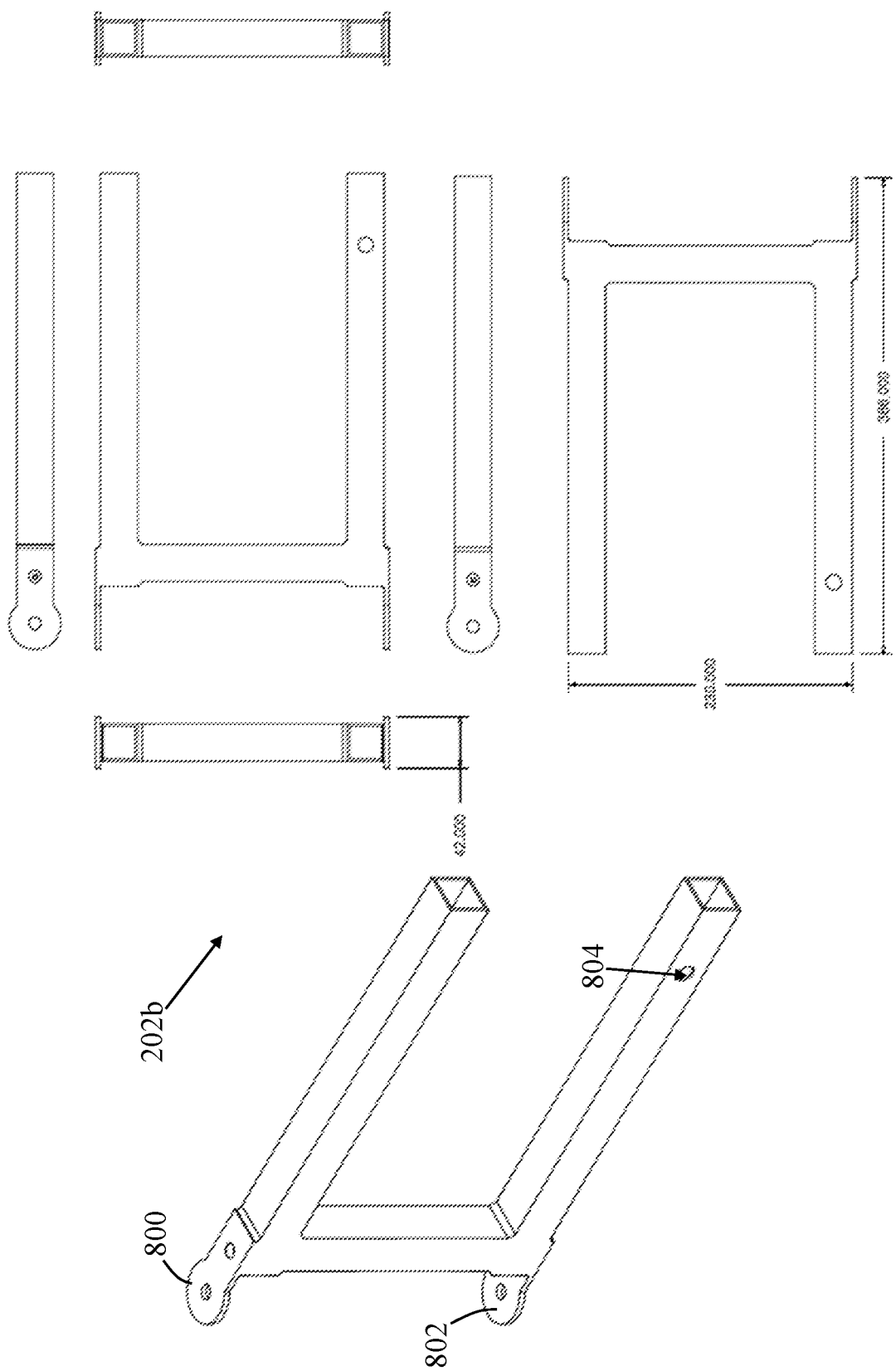
FIG. 8 are various views of a central hinge member of the monitor framing assembly in FIG. 2.
Figure 9:
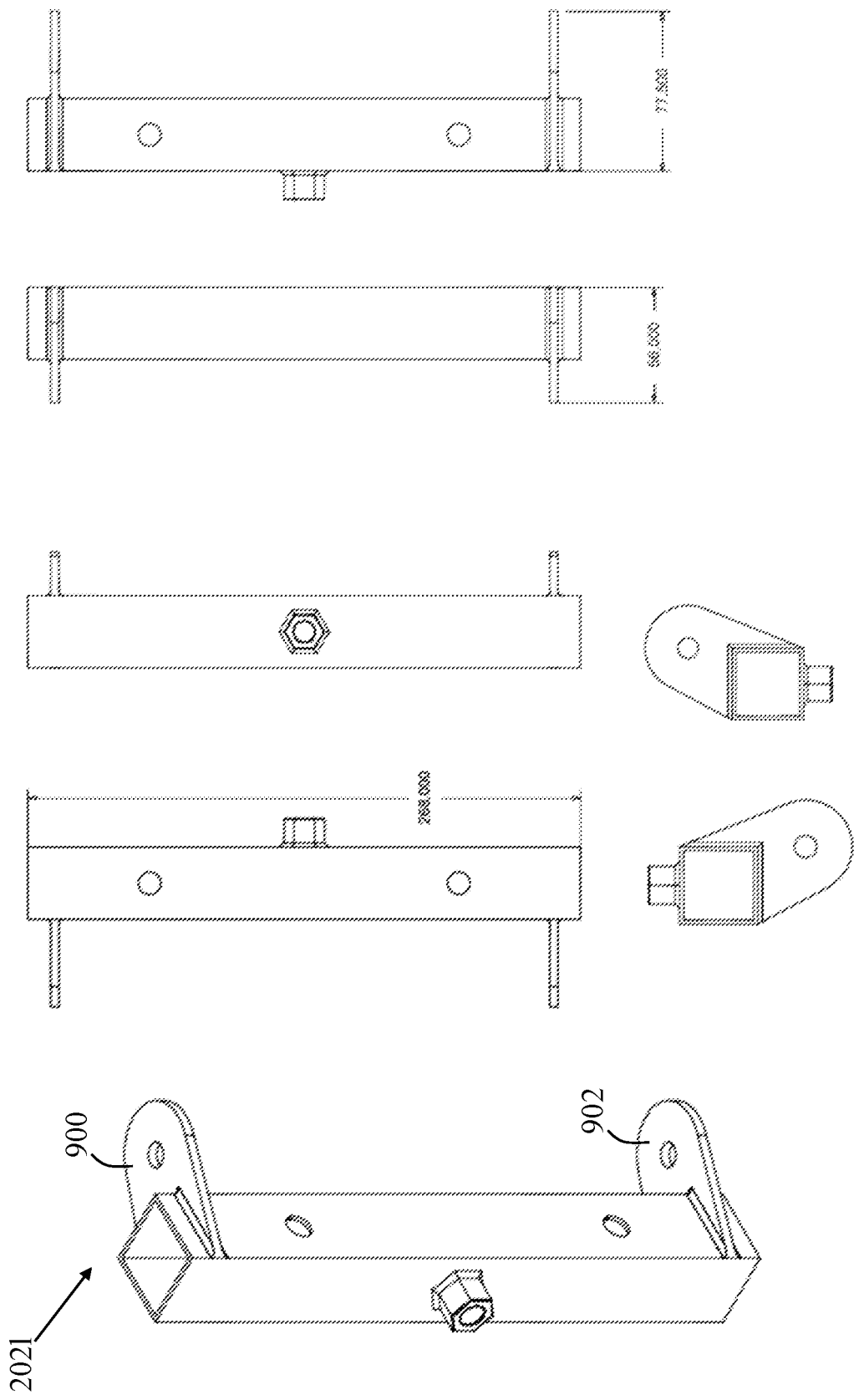
FIG. 9 are various views of an axial mounting frame element of the monitor framing assembly in FIG. 2.
Figure 14:
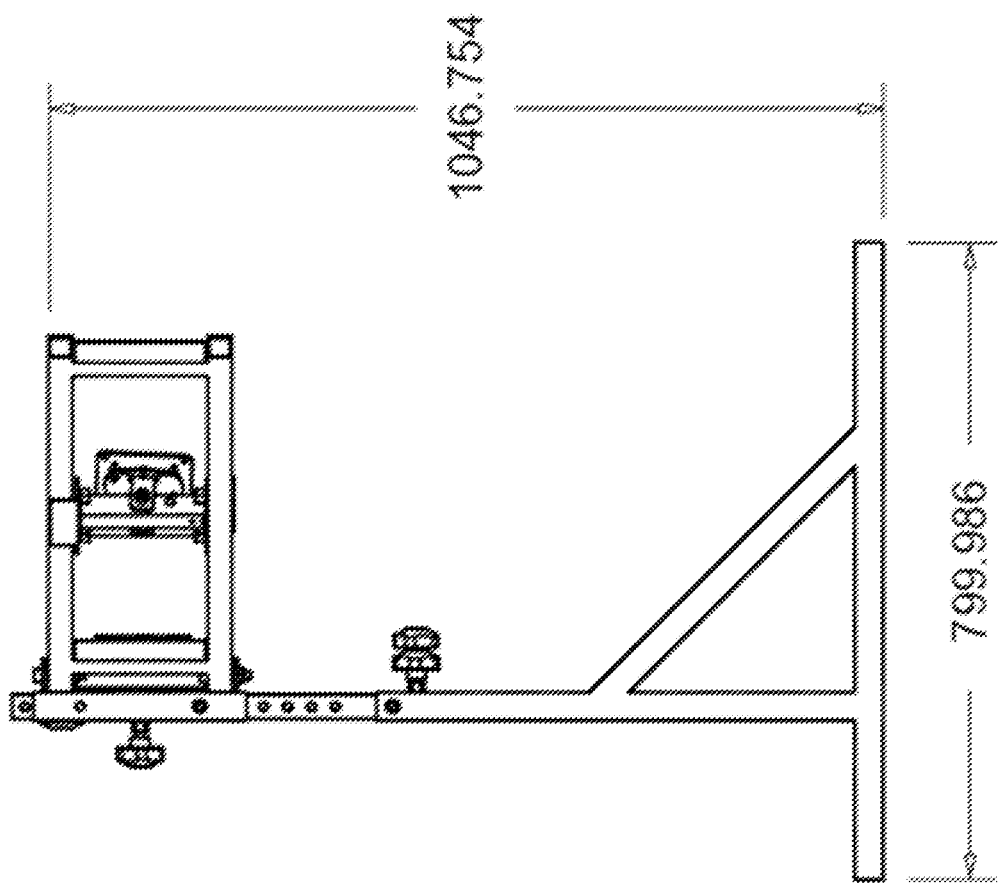
FIG. 14 is an elevational side view of the monitor framing assembly in FIG. 2.

In one embodiment, a central monitor frame element 202*a* is utilized that includes two substantially parallel (e.g., +/−5-10°) sections 204, 206 flanking and defining a central channel 208. The central monitor frame element 202*a* can be seen (best in FIG. 14) vertically offset from a lower surface of at least one lower leg frame element (or both leg frame elements if more than one is utilized). The central monitor frame element 202*a* includes a left side and right side opposing the left side of the central monitor frame element 202*a*. The central monitor frame element 202*a* includes a left central hinge member 202b selectively, translatably (e.g., linearly), lockably, and telescopically coupled to the left side of the central monitor frame element 202a and a right central hinge member 202b selectively, translatably, lockably, and telescopically coupled to the right side of the central monitor frame element 202a. The central hinge member 202b can be seen best exemplified in FIG. 8, and includes one or more flange elements 800, 802 for enabling coupling with an axial mounting frame element 202l, as exemplified best in FIG. 9 that also includes flange elements 900, 902.

Figure 7:
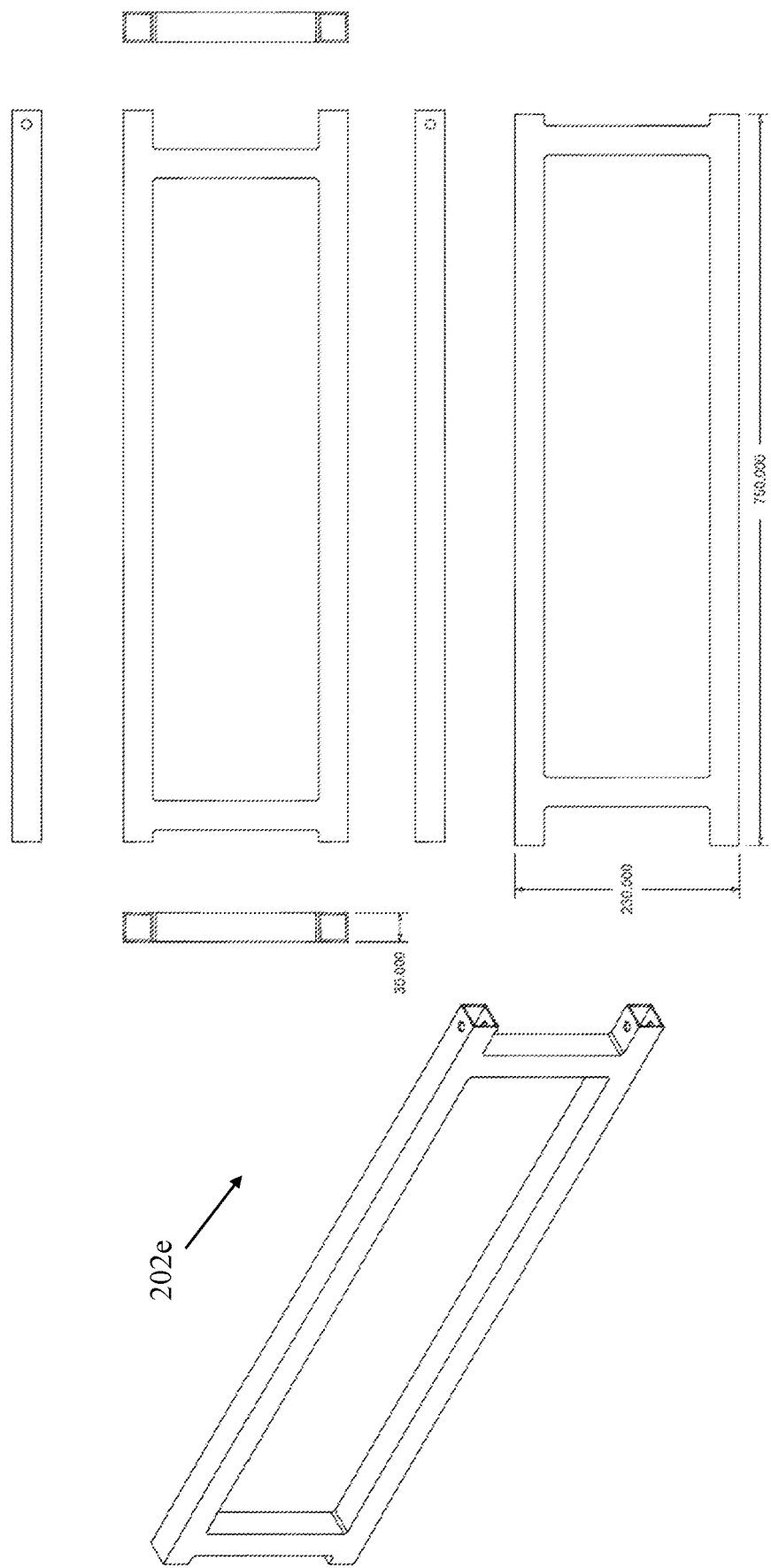
FIG. 7 are various views of a monitor frame element of the monitor framing assembly in FIG. 2.

Beneficially, a left monitor frame element 202e (as best seen exemplified in FIG. 7) is utilized with the present invention includes two substantially parallel sections 210, 212 flanking and defining a central channel 214 and having a left free side and a right side opposing the left free side of the left monitor frame element 202e and rotatably coupled to the left central hinge member 202b about a hinge. Additionally, a right monitor frame element 202f may be utilized that includes two substantially parallel sections 216, 218 flanking and defining a central channel 220 and having a left side rotatably coupled to the right central hinge member 202c about a hinge and having a right free side opposing the left side of the right monitor frame element 202f. The free sides enable free rotation of the monitor frame element.

Figure 10:
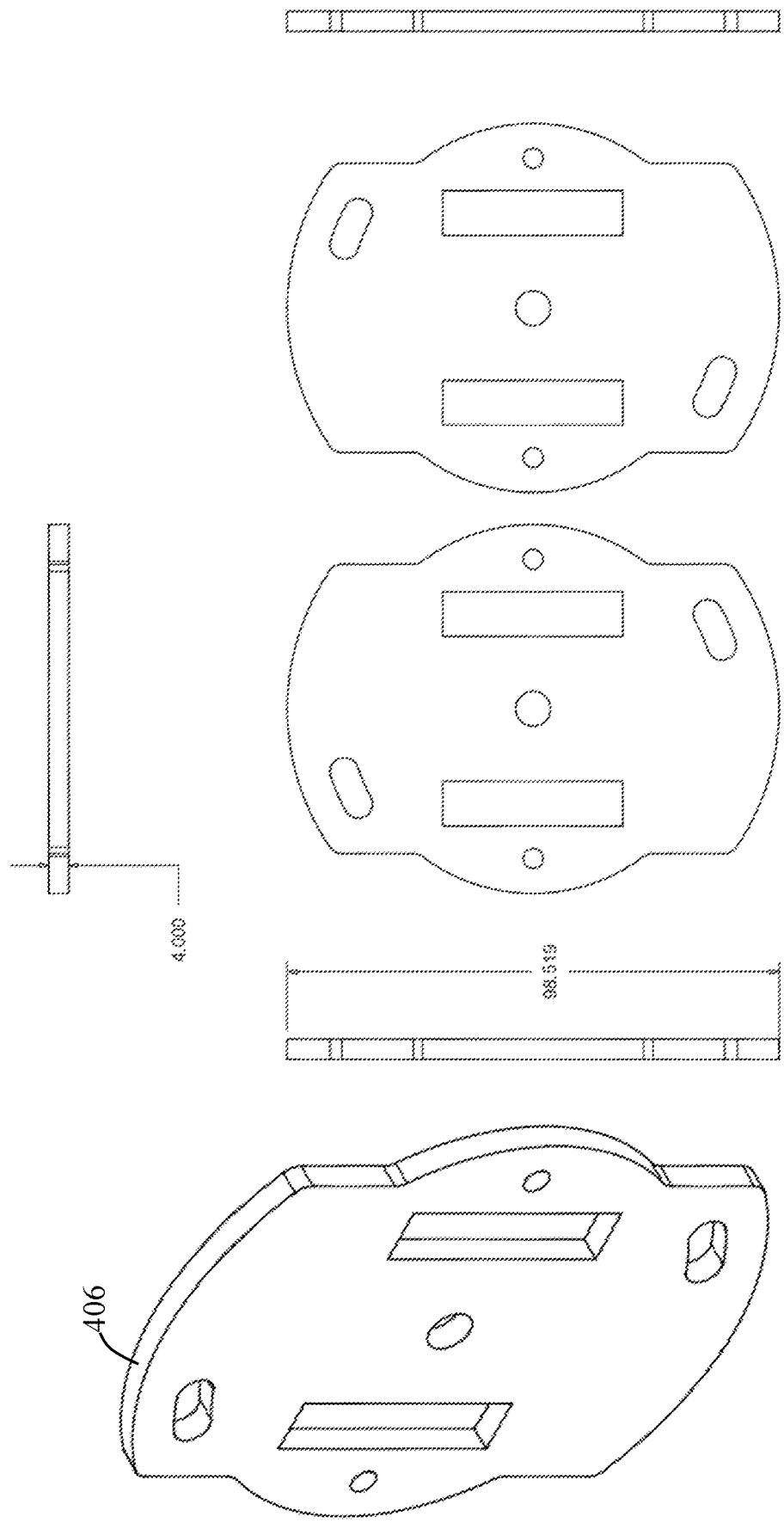
FIG. 10 are various views of a rotation pivot bracket lock of the monitor framing assembly in FIG. 2.
Figure 12:
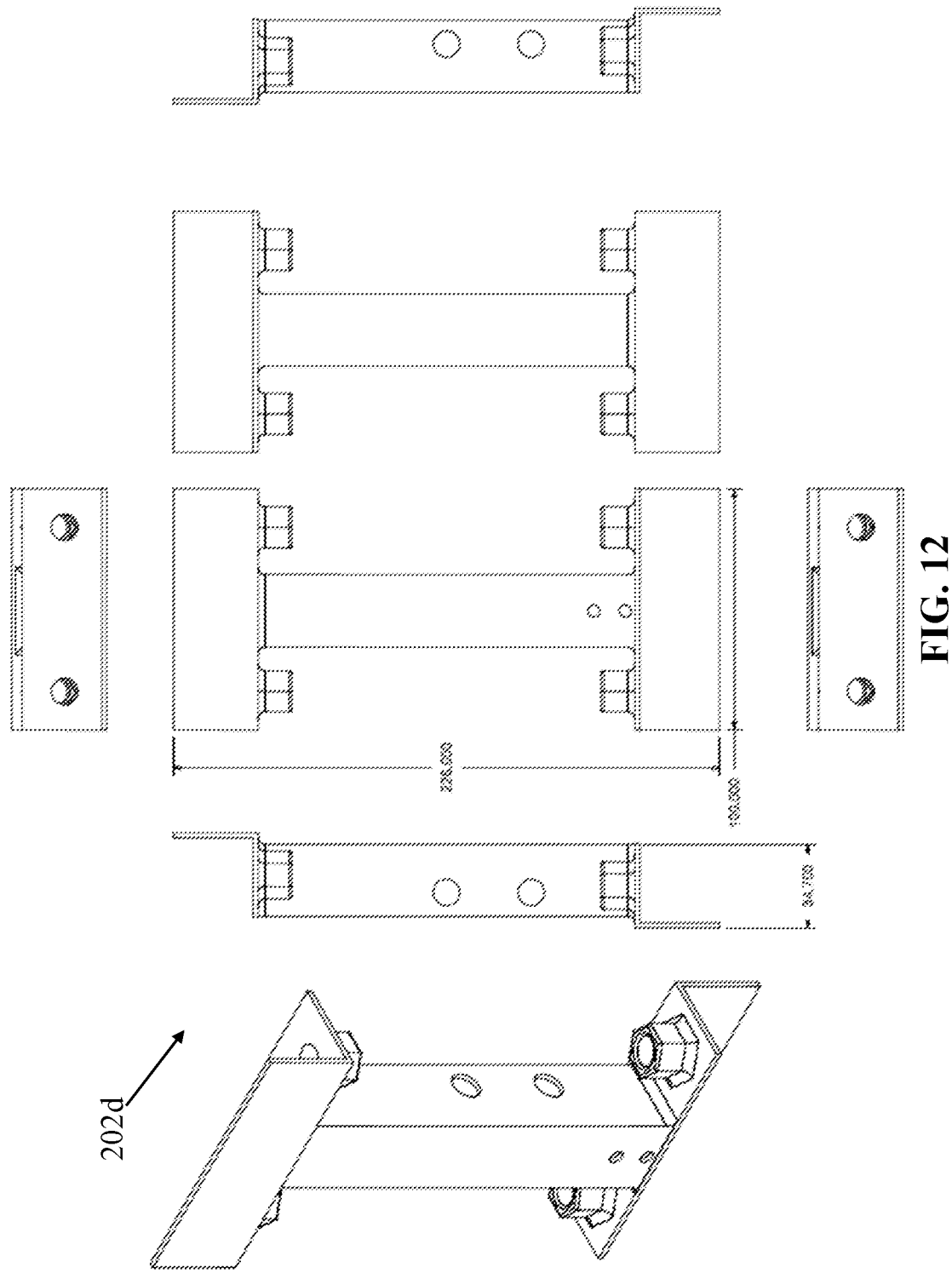
FIG. 12 are various views of a first screen support bracket frame element of the monitor framing assembly in FIG. 2.

The present invention may also include a first screen support bracket frame element 202d as best exemplified in FIG. 12. The screen support bracket frame element 202d includes opposing ends that are selectively, translatably (e.g., slid linearly), and lockably coupled to the two substantially parallel sections 204, 206 of the central monitor frame element 202a and are operable to be disposed within the central channel 208 defined thereon. The screen support bracket frame element 202d may beneficially include upper bracket walls of an L-shape that inverted on an opposing end thereon. The first screen support bracket frame element 202d includes an electronic display bracket 222 and a rotation pivot bracket 406 coupled thereto (as exemplified in FIG. 10). The electronic display bracket 222 and rotation pivot bracket 406 are operably configured to retain and enabling pivoting or rotation of an electronic display thereon (as best seen in FIG. 15).

In one embodiment, a second screen support bracket frame element 202g with opposing ends is also selectively, translatably, and lockably coupled to the two substantially parallel sections 210, 212 of the left monitor frame element 202e and is also disposed within the central channel 214 defined thereon. The second screen support bracket frame element 202g may also have having an electronic display bracket 224 and a rotation pivot bracket coupled thereto, wherein the electronic display bracket 224 and rotation pivot bracket are operably configured to retain an electronic display thereon.

Additionally, a third screen support bracket frame element 202h with opposing ends is also selectively, translatably, and lockably coupled to the two substantially parallel sections 216, 218 of the right monitor frame element 202f and disposed within the central channel 220 defined thereon. The third screen support bracket frame element 202h may also have an electronic display bracket 226 coupled thereto, wherein the electronic display bracket 226 and rotation pivot bracket are operably configured to retain an electronic display thereon. The electronic display brackets described herein may be of a mounting "vesa" plate operably configured to couple an electronic display (as exemplified in FIG. 15) thereto. The frame assembly of the system 4000 is beneficially operably configured to selectively adjust in height and width (as shown in the figures) to adapt to various sizes of electronic display, yet effectively and efficiently couple with a gaming chair assembly. To lock the various frame members into a particular position, the system may utilize one or more fastener(s) (as depicted in the figures).

In one embodiment, the monitor framing assembly 200 includes a left axial mounting frame element 202l selectively, translatably, lockably, and telescopically coupled to the first monitor frame vertical extension element 202i. The left axial mounting frame element 202l may have one or more fixed pivot flanges 800, 802 radially extending outwardly therefrom and forming the hinge about which the left monitor frame element 202e is rotatably coupled to the left central hinge member 202b. Additionally, a right axial mounting frame element 202m may be selectively, translatably, lockably, and telescopically coupled to the second monitor frame vertical extension element 202j, wherein the right axial mounting frame element 202m has one or more fixed pivot flanges 800, 802 radially extending outwardly therefrom and forming the hinge about which the right monitor frame element 202f is rotatably coupled to the right central hinge member 202c. The rotation may vary between approximately +/−90° relative to another adjacent electronic display. In one embodiment, the electronic display bracket 222 of the first screen support bracket frame element 202d is pivotably coupled thereto, wherein the electronic display bracket 224 of the second screen support bracket frame element 202g is pivotably coupled thereto. The electronic display bracket 226 of the third screen support bracket frame element 202h may also be pivotably coupled thereto.

Figure 6:
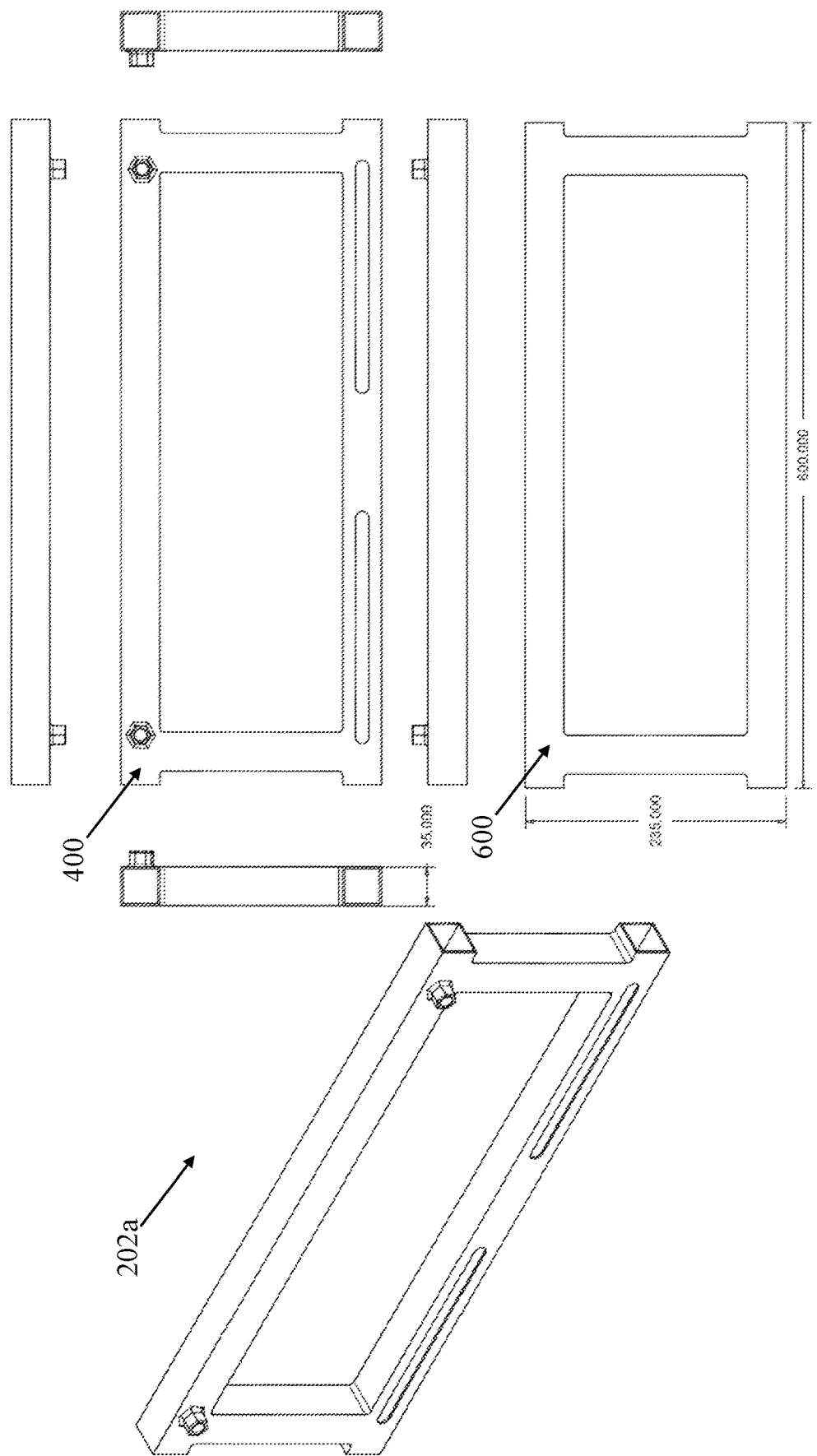
FIG. 6 are various views of a central monitor frame element of the monitor framing assembly in FIG. 2.

In one embodiment, the central monitor frame element 202a (as exemplified in FIG. 6) includes a front surface 600 (that may be planar) and a rear surface 400 (that may also be planar) opposing the front surface 600 of the central monitor frame element 202a. The central monitor frame element 202a defines one or more (but preferably two) enclosed slots 402, 404 on at least one of the two substantially parallel sections 204, 206 of the central monitor frame element 202a. The two enclosed slots 402, 404 each having a fastener disposed therethrough and operably configured to lockedly engage with one of the left central hinge member 202b (as exemplified in FIG. 8) and the right central hinge member 202b. In one embodiment, a fastener is inserted through each of the enclosed slots 402, 404 and is engaged with a threaded hole (e.g., hole 804).

Although a specific order of executing the process steps of a utilizing gaming chair assembly with modular multi-monitor mount system has been disclosed, the order of executing the steps may be changed relative to the order shown in certain embodiments. Also, two or more steps described or shown as occurring in succession may be executed concurrently or with partial concurrence in some embodiments. Certain steps may also be omitted for the sake of brevity. In some embodiments, some or all of the process steps can be combined into a single process.

Moreover, various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:
1. A gaming chair assembly with modular multi-monitor mount system comprising:

a modular gaming chair frame assembly having a plurality of tubular frame elements selectively coupled together and with a base frame assembly defining a support plane and a center post assembly coupled to the base frame assembly and including a center post frame element disposed in an upright orientation respect to the support plane; and a monitor framing assembly having a plurality of tubular framing elements selectively coupled together and with:
- a first lower leg frame element and a second lower leg frame element directly coupled to the base frame assembly;
- a first monitor frame vertical extension element selectively, translatably, lockably, and telescopically coupled to the first lower leg frame element and a second monitor frame vertical extension element selectively, translatably, lockably, and telescopically coupled to the second lower leg frame element;
- a central monitor frame element having two substantially parallel sections flanking and defining a central channel and having a left side and right side opposing the left side of the central monitor frame element, a left central hinge member selectively, translatably, lockably, and telescopically coupled to the left side of the central monitor frame element, and a right central hinge member selectively, translatably, lockably, and telescopically coupled to the right side of the central monitor frame element;
- a left monitor frame element having two substantially parallel sections flanking and defining a central channel and having a left free side and a right side opposing the left free side of the left monitor frame element and rotatably coupled to the left central hinge member about a hinge;
- a right monitor frame element having two substantially parallel sections flanking and defining a central channel and having a left side rotatably coupled to the right central hinge member about a hinge and having a right free side opposing the left side of the right monitor frame element;
- a first screen support bracket frame element with opposing ends selectively, translatably, and lockably coupled to the two substantially parallel sections of the central monitor frame element and disposed within the central channel defined thereon, the first screen support bracket frame element having an electronic display bracket coupled thereto, the electronic display bracket operably configured to retain an electronic display thereon;
- a second screen support bracket frame element with opposing ends selectively, translatably, and lockably coupled to the two substantially parallel sections of the left monitor frame element and disposed within the central channel defined thereon, the second screen support bracket frame element having an electronic display bracket coupled thereto, the electronic display bracket operably configured to retain an electronic display thereon; and
- a third screen support bracket frame element with opposing ends selectively, translatably, and lockably coupled to the two substantially parallel sections of the right monitor frame element and disposed within the central channel defined thereon, the third screen support bracket frame element having an electronic display bracket coupled thereto, the electronic display bracket operably configured to retain an electronic display thereon.

2. The gaming chair assembly with modular multi-monitor mount system according to claim 1, further comprising:
a main rudder frame element directly coupled to the base frame assembly, the center post frame element selectively, translatably, lockably, and telescopically coupled to the main rudder frame element and centrally disposed with respect to the base frame assembly.

3. The gaming chair assembly with modular multi-monitor mount system according to claim 1, wherein the center post assembly further comprises:
a secondary center post frame element selectively, translatably, lockably, and telescopically coupled to the center post frame element.

4. The gaming chair assembly with modular multi-monitor mount system according to claim 1, wherein the base frame assembly further comprises:
two horizontally oriented base frame elements and two vertically oriented base frame elements intersected with the base frame elements, the first and second lower leg frame elements telescopically coupled to the two vertically oriented base frame elements, respectively.

5. The gaming chair assembly with modular multi-monitor mount system according to claim 1, wherein the monitor framing assembly further comprises:
a left axial mounting frame element selectively, translatably, lockably, and telescopically coupled to the first monitor frame vertical extension element, the left axial mounting frame element having the two fixed pivot flanges radially extending outwardly therefrom and forming the hinge about which the left monitor frame element is rotatably coupled to the left central hinge member; and
a right axial mounting frame element selectively, translatably, lockably, and telescopically coupled to the second monitor frame vertical extension element, the right axial mounting frame element having the two fixed pivot flanges radially extending outwardly therefrom and forming the hinge about which the right monitor frame element is rotatably coupled to the right central hinge member.

6. The gaming chair assembly with modular multi-monitor mount system according to claim 1, wherein the electronic display bracket of the first screen support bracket frame element is pivotably coupled thereto, the electronic display bracket of the second screen support bracket frame element is pivotably coupled thereto, and the electronic display bracket of the third screen support bracket frame element is pivotably coupled thereto.

7. The gaming chair assembly with modular multi-monitor mount system according to claim 1, wherein the central monitor frame element further comprises:
a front surface and a rear surface opposing the front surface of the central monitor frame element and defining two enclosed slots on at least one of the two substantially parallel sections of the central monitor frame element, the two enclosed slots each having a fastener disposed therethrough and operably configured to lockedly engage with one of the left central hinge member and the right central hinge member.

8. The gaming chair assembly with modular multi-monitor mount system according to claim 1, wherein:
the center post frame element is interposed between the base frame assembly and the central monitor frame element.

9. A gaming chair assembly with modular multi-monitor mount system comprising:
- a modular gaming chair frame assembly having a plurality of tubular frame elements selectively coupled together and with a base frame assembly defining a support plane and a center post assembly coupled to the base frame assembly and including a center post frame element disposed in an upright orientation respect to the support plane; and
- a monitor framing assembly having a plurality of tubular framing elements selectively coupled together and with:
  - at least one lower leg frame element directly coupled to the base frame assembly;
  - a central monitor frame element vertically offset from the at least one lower leg frame element and having two substantially parallel sections flanking and defining a central channel and having a left side and right side opposing the left side of the central monitor frame element, a left central hinge member selectively, translatably, lockably, and telescopically coupled to the left side of the central monitor frame element, and a right central hinge member selectively, translatably, lockably, and telescopically coupled to the right side of the central monitor frame element, wherein the center post frame element is interposed between the base frame assembly and the central monitor frame element;
  - a left monitor frame element having two substantially parallel sections flanking and defining a central channel and having a left free side and a right side opposing the left free side of the left monitor frame element and rotatably coupled to the left central hinge member about a hinge;
  - a right monitor frame element having two substantially parallel sections flanking and defining a central channel and having a left side rotatably coupled to the right central hinge member about a hinge and having a right free side opposing the left side of the right monitor frame element;
  - a first screen support bracket frame element with opposing ends selectively, translatably, and lockably coupled to the two substantially parallel sections of the central monitor frame element and disposed within the central channel defined thereon, the first screen support bracket frame element having an electronic display bracket coupled thereto, the electronic display bracket operably configured to retain an electronic display thereon;
  - a second screen support bracket frame element with opposing ends selectively, translatably, and lockably coupled to the two substantially parallel sections of the left monitor frame element and disposed within the central channel defined thereon, the second screen support bracket frame element having an electronic display bracket coupled thereto, the electronic display bracket operably configured to retain an electronic display thereon; and
  - a third screen support bracket frame element with opposing ends selectively, translatably, and lockably coupled to the two substantially parallel sections of the right monitor frame element and disposed within the central channel defined thereon, the third screen support bracket frame element having an electronic display bracket coupled thereto, the electronic display bracket operably configured to retain an electronic display thereon.

10. The gaming chair assembly with modular multi-monitor mount system according to claim 9, wherein the at least one lower leg frame element includes a first lower leg frame element and a second lower leg frame element defining a space therein between and each directly coupled to the base frame assembly.

11. The gaming chair assembly with modular multi-monitor mount system according to claim 9, wherein the plurality of tubular framing elements of the monitor framing assembly further comprise:
- a first monitor frame vertical extension element selectively, translatably, lockably, and telescopically coupled to the first lower leg frame element and a second monitor frame vertical extension element selectively, translatably, lockably, and telescopically coupled to the second lower leg frame element.

12. The gaming chair assembly with modular multi-monitor mount system according to claim 11, wherein the monitor framing assembly further comprises:
- a left axial mounting frame element selectively, translatably, lockably, and telescopically coupled to the first monitor frame vertical extension element, the left axial mounting frame element having the two fixed pivot flanges radially extending outwardly therefrom and forming the hinge about which the left monitor frame element is rotatably coupled to the left central hinge member; and
- a right axial mounting frame element selectively, translatably, lockably, and telescopically coupled to the second monitor frame vertical extension element, the right axial mounting frame element having the two fixed pivot flanges radially extending outwardly therefrom and forming the hinge about which the right monitor frame element is rotatably coupled to the right central hinge member.

13. The gaming chair assembly with modular multi-monitor mount system according to claim 9, wherein the electronic display bracket of the first screen support bracket frame element is pivotably coupled thereto, the electronic display bracket of the second screen support bracket frame element is pivotably coupled thereto, and the electronic display bracket of the third screen support bracket frame element is pivotably coupled thereto.

14. The gaming chair assembly with modular multi-monitor mount system according to claim 9, wherein the central monitor frame element further comprises:
- a front surface and a rear surface opposing the front surface of the central monitor frame element and defining two enclosed slots on at least one of the two substantially parallel sections of the central monitor frame element, the two enclosed slots each having a fastener disposed therethrough and operably configured to lockedly engage with one of the left central hinge member and the right central hinge member.

15. The gaming chair assembly with modular multi-monitor mount system according to claim 9, wherein the center post assembly further comprises:
- a secondary center post frame element selectively, translatably, lockably, and telescopically coupled to the center post frame element.

16. The gaming chair assembly with modular multi-monitor mount system according to claim 9, wherein the base frame assembly further comprises:
- two horizontally oriented base frame elements and two vertically oriented base frame elements intersected with the base frame elements, the first and second lower leg frame elements telescopically coupled to the two vertically oriented base frame elements, respectively.

\* \* \* \* \*